April 21, 1970 R. F. STENGEL 3,507,150

WIND VELOCITY PROBING DEVICE AND METHOD

Filed Jan. 24, 1966 4 Sheets-Sheet 1

*INVENTOR*
ROBERT F. STENGEL

BY

*ATTORNEY*

INVENTOR
ROBERT F. STENGEL

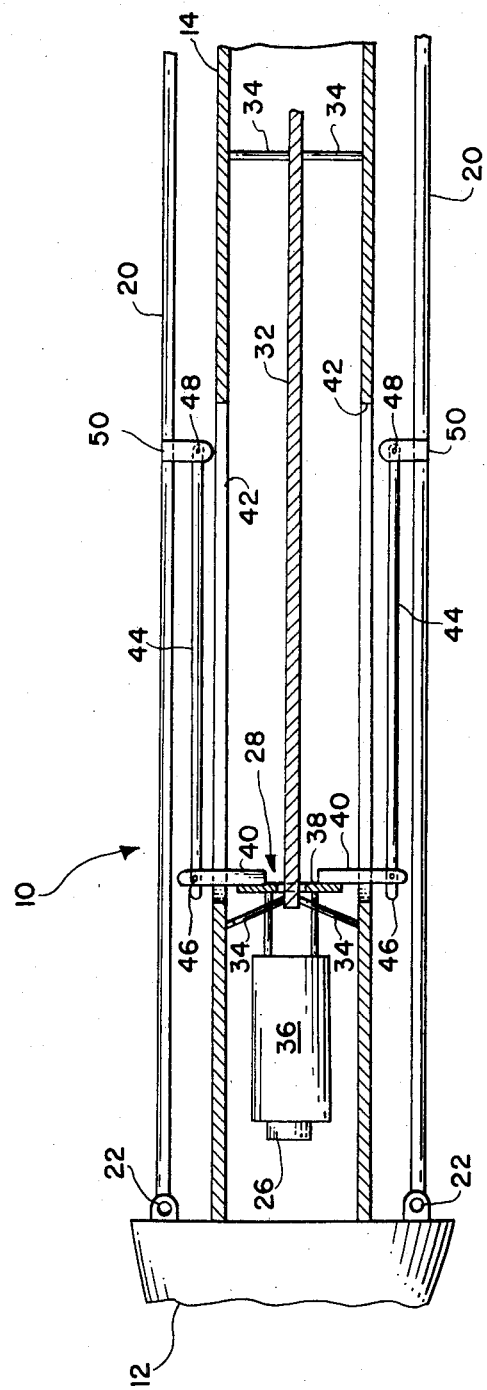

INVENTOR
ROBERT F. STENGEL

BY

*C. Gordon McBride*
ATTORNEY

United States Patent Office 3,507,150
Patented Apr. 21, 1970

3,507,150
WIND VELOCITY PROBING DEVICE
AND METHOD
Robert F. Stengel, 41 Spring St.,
Princeton, N.J. 08540
Filed Jan. 24, 1966, Ser. No. 522,795
Int. Cl. G01w 1/08
U.S. Cl. 73—189
2 Claims

ABSTRACT OF THE DISCLOSURE

A method and apparatus for probing an altitude interval and obtaining profiles of wind velocities over the altitude interval including the release of a body having a low frontal and high lateral projected area over the test area and radar tracking of the body during its free-fall descent to obtain indications of lateral deviations of the body from the vertical which is in turn a measure of the wind velocities at the various altitudes.

---

The invention described herein was made by a former employee of the United States Government and may be manufactured and used by or for the Government for governmental purposes without the payment of any royalties thereon or therefor.

The invention relates generally to a wind sensor and more particularly to a device for permitting obtaining accurate data as to wind direction and velocity.

The launching of rockets or missiles involves various factors not the least of which is the wind profile along the ascent trajectory of the vehicle. Known wind sensors include rising and falling balloons, falling "chaff" and falling parachutes, all of which are radar reflective to facilitate radar measurement of the sensor's path. These sensors are used in conjunction with ground-based tracking radar sets which measure the vertical and horizontal motion of the sensors. These motions are interrupted to represent the wind velocity as a function of time and altitude. All these sensors can be carried aloft by meteorological rockets. In addition, balloons are frequently carried aloft by the buoyancy of the helium they contain. Observance of a smoke trail provides another means of sensing wind direction and velocity.

The primary disadvantage of presently used wind sensors is the time required to collect data in the altitude region of interest. Balloons commonly take an hour and a half to traverse the altitudes from sea level to 90,000 feet. Depending on the weight, height and to-area ratio, parachutes and chaff reduce this time two-thirds. None of the prior sensors traverses the altitude region quickly enough to give an instantaneous indication of wind at all altitudes. A secondary effect is that due to the time required, these sensors travel far from the launch site and cannot be said to be sensing the winds in the area of immediate interest. Chaff has the additional disadvantage that it disperses as it falls. The cloud of dipoles, packed closely at ejection, spreads to a very large size causing a generally reduced radar return and searching of the cloud by the radar, as the set automatically seeks the strongest return. Eventually the cloud disperses and can no longer be tracked for wind data.

Parachutes and balloons are said to occasionally exhibit a tendency to "sail," that is, to have a horizontal motion in the absence of winds. This is caused by the flexible geometry of the sensor which in theory can cause a normal, as well as a drag force. Whereas the normal force is in fact a desirable aspect of a lifting sensor, its existence can be detrimental to balloons and parachutes which rely on the drag force for wind measurement.

A vertically dispensed trial of smoke can be photographed at regular time intervals to determine the wind profile. Although the smoke trail method yields good data, it is too severely limited for prelaunch operational use when measurements can be made only under near-perfect visibility conditions during the daylight hours. Haze and clouds can obscure the smoke trail and the sun must be above and behind the photographic sites to assure good contrast between the smoke trail and the sky. Reduction of the photographic data is a time-consuming process which presently cannot be completed quickly enough to make the data useful in prelaunch operations. Another limitation is that a 1500-pound rocket is required to carry enough chemical material to produce a smoke trail to 70,000 feet.

In order to overcome the disadvantages of the prior art, the instant invention contemplates use of a light ballast weight, placed forward for aerodynamic stability, and four large delta wings in cruciform arrangement. The skeletal structure of the wings is covered with aluminized Mylar film to provide a lifting and radar-reflective surface.

It is an object of the instant invention to provide a sensor for rapidly measuring winds over a large altitude interval.

A further object of this invention is to provide a sensor to make wind measurements in a minimum time period of at least an order of magnitude greater than that of existing techniques.

Another object of the instant invention is to provide a wind sensor presenting a minimum area to the vertical and yet which is sensitive to the horizontal component of wind by presenting a maximum area to air currents in the horizontal plane.

Still another object of this invention is to provide a lifting sensor having delta wings in cruciform arrangement with a ballast nose for proper orientation of the sensor during descent.

Generally, the foregoing and other objects are accomplished by utilizing a body having a ballast nose at one end to which are pivoted the leading edges of the delta wings. A flexible film of radar-reflective material extends between the body and the wing leading edges to provide a sensor capable of rapid descent over a launch site. The leading edges of the wings may be inflatable or other deployment devices used for transforming the sensor from a collapsed to a deployed configuration upon the occurrence of a predetermined event, such as reaching a specific altitude.

A more complete appreciation of the invention and many of the attendant advantages thereof will be readily apparent as the same becomes better understood by reference to the following description when considered in connection with the accompanying drawings wherein:

FIG. 4 is a diagrammatic cross-sectional view of a mechanism for deployment of one embodiment of the invention;

Figure 1:
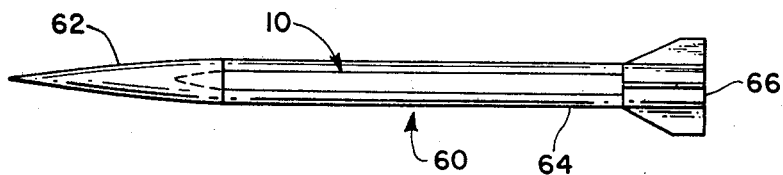
FIG. 1 is a diagrammatic view of a payload incorporating the instant invention.

Referring now to the drawings and more particularly to FIG. 1 wherein payload 60 is shown to include nose cone 62 on the forward end of sensor container 64 and fin section 66 attached to the after end of container 64.

A lifting sensor, generally designated numeral 10, is shown housed within container 64.

Figure 2:
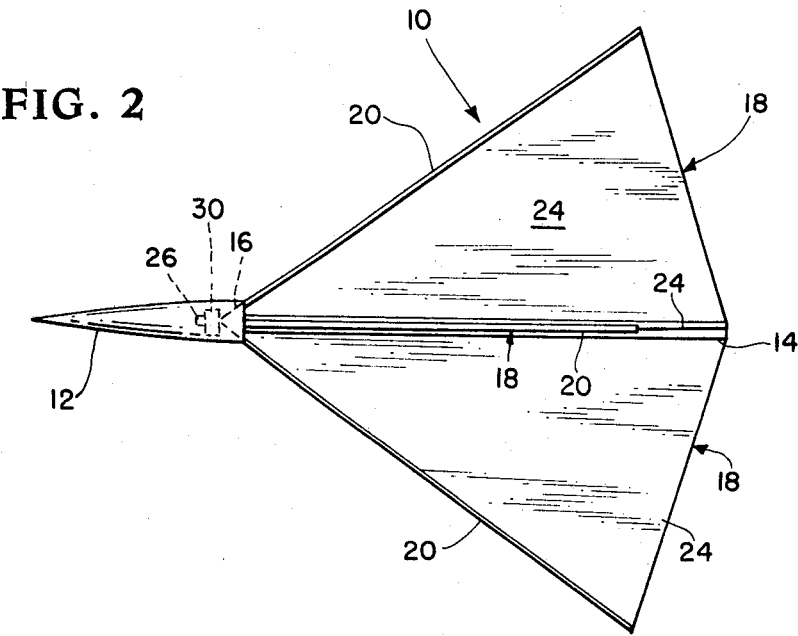
FIG. 2 is a diagrammatic plan view of one embodiment of the instant invention.

FIG. 2 shows one embodiment of lifting sensor 10. Ballast nose 12 is of substantially projectile configuration and is rigidly attached to one end of body 14. Delta wings 18 extend outwardly from body 14 and are in a substantially cruciform arrangement. Leading edges 20 of wings 18 are made from a flexible, air-impervious material, such as Mylar, and are formed to deploy outwardly upon inflation. Leading edges 20 connect with inflator 30, a source of pneumatic pressure, which may be housed in the hollow ballast nose 12 and connected with leading edges 20 by any conventional conduits 16. Initiator 26 is associated with pneumatic supply source 30 for activation thereof upon the occurrence of a predetermined event, such for example, as attaining a prescribed altitude or at a time signal. Activation of inflator 30 causes leading edges 20 to deploy and stretch aluminized Mylar wing 24 to provide the cruciform configuration of lifting sensor 10.

Figure 3:
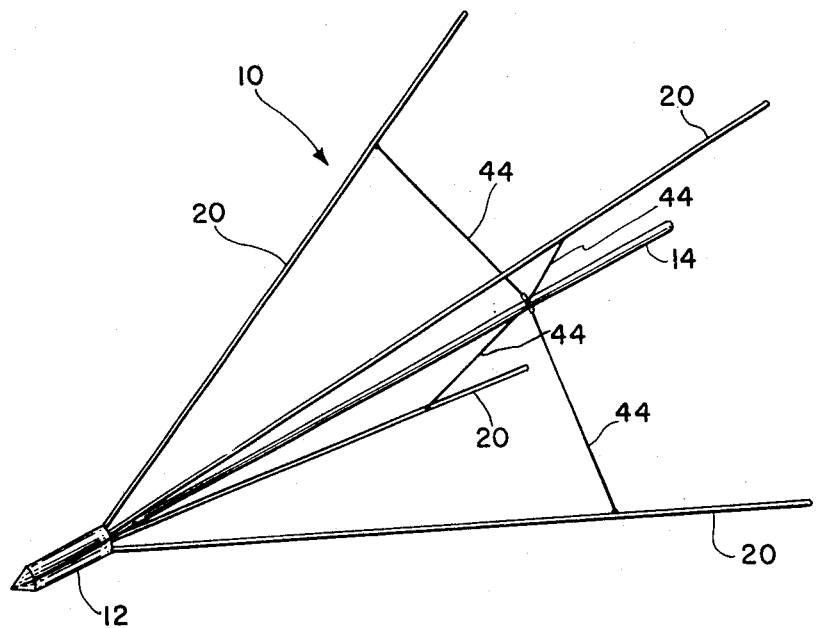
FIG. 3 is a perspective view of the structural skeleton of an embodiment of the invention.
Figure 6:
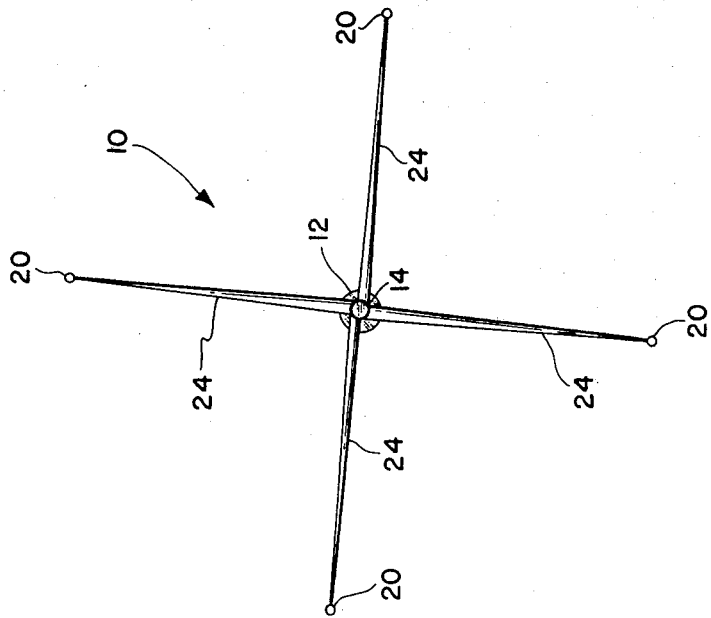
FIG. 6 is a diagrammatic end view of the embodiment of FIG. 5.
Figure 5:
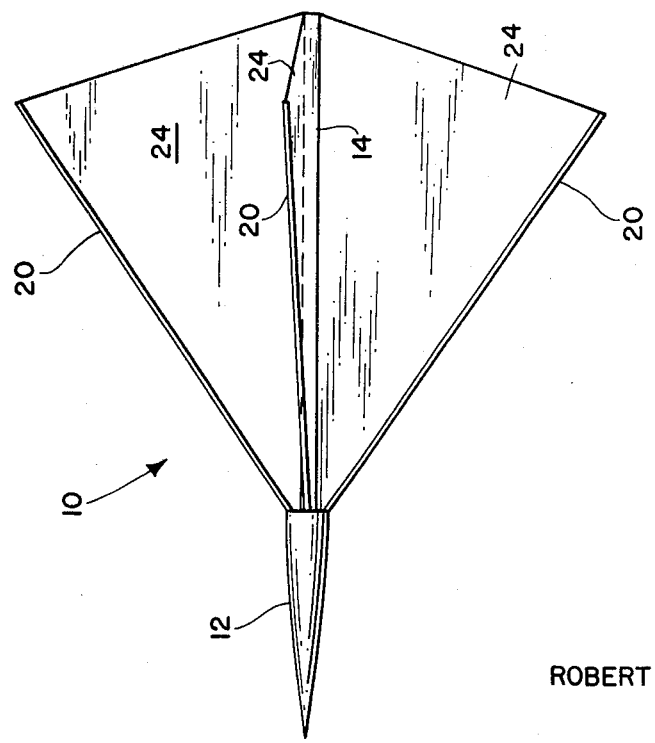
FIG. 5 is a diagrammatic plan view of an alternative embodiment of the invention.

Referring to FIG. 3, wherein the structural skeleton of lifting sensor 10 is shown to include ballast nose 12 attached to body 14 with leading edges 20 diverging rearwardly from nose 12. Links 44 connect leading edges 20 with body 14 and may be utilized in providing a rigid structure. For example, links 44 could be rigidly secured to body 14 and leading edge 20 and lifting sensor 10 would be of fixed configuration with wings 18, not fully shown, being at right angles to one another to provide the cruciform configuration. An alternative embodiment is contemplated wherein, for example, links 44 would be spring members rigidly attached to body 14 and pivotally connected to leading edges 20. Such a construction would automatically deploy upon ejection from a container. FIGS. 5 and 6 show another alternative embodiment of lifting sensor 10 wherein delta wings 18 are canted to the longitudinal axis of body 14. This canted wing construction provides augmented stability by inducing spinning and thus a measure of gyroscopic stability.

FIG. 4 shows body 14 constructed of a tubular member rigidly secured to ballast nose 12 at one end. Mechanical deployment device 28 includes rod 32 centrally located in body 14 and held in place by mounts 34. Actuator 36 is of conventional construction and could utilize pneumatic or hydraulic pressure, mechanical springs, or electric motors and is connected to follower ring or annulus 38 which fits about rod 32. Arms 40 are rigidly secured to follower 38 and extend through slots 42 in body 14. As is readily apparent, slots 42 and arms 40 are respectively perpendicular to one another to provide the cruciform arrangement of wings 18 (not shown). Links 44 are pivotally connected to arms 40 and 46 and have the other end pivotally connected to bracket 50 at pivot point 48. Brackets 50 are attached to leading edges 20 at a point such that when links 44 are fully extended, leading edges 20 will be fully deployed and wing material 24, connected to leading edges 20 and body 14 in a conventional manner, will be stretched taut to provide stable wing forms.

Upon the occurrence of a predetermined event, initiator 26 activates actuator 36 which forces follower 38 to ride along rod 32 and force arms 40 rearwardly of body 14 in slots 42. As arms 40 move rearwardly, links 44 are caused to deploy and, through pivotal connections 46 and 48, force leading edges 20 to pivot about pivot point 22 and expand fully. Although FIGS. 2 and 4 show deployment systems for the instant sensor, it is to be understood that any conventional system could be utilized; for example, the mechanism of FIG. 2 in United States Patent 3,197,158 issued to F. M. Rogallo on July 27, 1965.

It is intended that the probe be carried to peak altitude by a meteorological rocket including payload 60. However, it is to be understood that many conventional means, such as balloons, are available for carrying sensor 10 to the proper altitude. At peak altitudes, payload 60 is released with fin section 66 being disconnected and lifting sensor 10 ejected from container 64. Once free of container 64, initiator 26 would be utilized to activate deployment device 36 and thus cause expansion or deployment into the fully erected cruciform arrangement with ballast nose 12 orienting sensor 10 as it falls toward the earth. As its name implies, the lifting sensor derives its wind sensitivity from the lift force, rather than the drag force, provided by the relative air velocity. The sensor is a statically stable airplaine or missile-like configuration possessing 120° or higher order rotational symmetry about its longitudinal axis. In the absence of wind, sensor 10 falls vertically wiith its longitudinal axis alined with the vertical due to its static stability. The cruciform configuration presents its minimum area to the vertical for high fall velocity and its maximum area to the horizontal for high wind sensitivity.

The chief advantage of the lifting sensor design of the instant invention is the short time required to collect wind data over a large altitude range. There are several gains to be obtained as a result in that the collected winds more nearly represent a vertical sampling of the winds at an instant of time. The reduced time required for a wind run allows personnel and facilities to be free for other functions, resulting in a substantial economic saving and allowing increased freedom in operation scheduling. The horizontal displacement of the probe will be much less than that of other sensors, thus allowing measurements of the winds more nearly above the launch sites. Further, the instant sensor maintains simplicity to provide overall system reliability.

Obviously, many modifications and variations of the subject invention are possible in the light of the above teachings. For example, an annular wing may be utilized or the wings constructed of plural sheets for complete inflation thereof.

It is therefore to be understood that within the scope of the appended claims the invention may be practiced otherwise than as specifically described.

What is claimed as new and desired to be secured by Letters Patent of the United States is:

1. A lifting sensor comprising: a body member ballasted for orientation during flight; reflective means mounted on said body comprised of a plurality of delta wings arranged in a cruciform, extending from said body and having leading edges pivotally connected to said body, constructed of a flexible air impervious material, with reflective material attached to said body and said leading edges; a source of fluid pressure operatively connected with said leading edges; and means for activating said source, whereby said leading edges are extended to dispose said reflective material so as to present a maximum area to horizontal wind components.

2. A lifting sensor comprising: a body member ballasted for orientation during flight; reflective means comprising a plurality of delta wings arranged in a cruciform and extending from said body, having leading edges pivotally connected to said body, with radar reflective material connected to said body and said leading edges; and means for deploying said leading edges comprising links having one end pivotally attached to said leading edges and arms pivotally connected to the other end of said links; said deployment means further including actuator means connected to move said arms and releasing means to control the actuator means, whereby said leading edges and the connected reflective material are deployed in response to activation of the releasing means.

(References on following page)

References Cited

UNITED STATES PATENTS

| | | | |
|---|---|---|---|
| 1,243,542 | 10/1917 | Moore | 244—3.27 |
| 2,494,026 | 1/1950 | Anderson | 244—3.27 |
| 2,938,681 | 5/1960 | Palermo | 244—49 |
| 3,340,732 | 9/1967 | Scoggins | 73—189 |

FOREIGN PATENTS 642,411  2/1937  Germany.

OTHER REFERENCES

Stone, I.: Early Inflatable Micrometeroid Paraglider Re-entry Tests Planned, from Aviation Week and Space Technology. Oct. 8, 1962, page 32.

RICHARD C. QUEISSER, Primary Examiner

J. W. MYRACLE, Assistant Examiner

U.S. Cl. X.R.

244—49